United States Patent
Kennedy, Jr. et al.

(10) Patent No.: US 7,546,084 B2
(45) Date of Patent: Jun. 9, 2009

(54) SYSTEM AND METHOD OF OPERATION FOR NETWORK OVERLAY GEOLOCATION SYSTEM WITH REPEATERS

(75) Inventors: Joseph P. Kennedy, Jr., Great Falls, VA (US); Thomas Booker Gravely, Herndon, VA (US); Andrew Beck, Ashburn, VA (US); John P. Carlson, Herndon, VA (US); Martin Alles, Hamilton Parish (BM)

(73) Assignee: Andrew LLC, Hickory, NC (US)

( * ) Notice: Subject to any disclaimer, the term of this patent is extended or adjusted under 35 U.S.C. 154(b) by 0 days.

(21) Appl. No.: 10/531,038

(22) PCT Filed: Jan. 16, 2003

(86) PCT No.: PCT/US03/32580

§ 371 (c)(1),
(2), (4) Date: Apr. 12, 2005

(87) PCT Pub. No.: WO2004/036936

PCT Pub. Date: Apr. 29, 2004

(65) Prior Publication Data

US 2006/0003695 A1    Jan. 5, 2006

(51) Int. Cl.
*H04B 7/185* (2006.01)
*H04B 1/60* (2006.01)
*H04B 17/02* (2006.01)
*H04B 7/00* (2006.01)
*H04W 24/00* (2009.01)

(52) U.S. Cl. .................. 455/9; 455/13.1; 455/456.1; 455/521

(58) Field of Classification Search .............. 455/404.2, 455/414.2, 456.1, 457, 521, 524, 9, 67.16, 455/13.1, 524.9
See application file for complete search history.

(56) References Cited

U.S. PATENT DOCUMENTS

| 4,783,744 | A |   | 11/1988 | Yueh |
|---|---|---|---|---|
| 5,317,323 | A |   | 5/1994 | Kennedy et al. |
| 5,387,902 | A | * | 2/1995 | Lockyer et al. .............. 370/225 |
| 5,465,289 | A |   | 11/1995 | Kennedy, Jr. et al. |
| 5,506,863 | A |   | 4/1996 | Meidan |
| 5,870,029 | A |   | 2/1999 | Otto et al. |
| 5,982,322 | A | * | 11/1999 | Bickley et al. ......... 342/357.08 |
| 6,020,847 | A | * | 2/2000 | Upton et al. ........... 342/357.16 |
| 6,144,711 | A |   | 11/2000 | Raleigh et al. |
| 6,166,691 | A | * | 12/2000 | Lindqvist .................... 342/465 |
| 6,188,351 | B1 | * | 2/2001 | Bloebaum .............. 342/357.15 |
| 6,212,319 | B1 |   | 4/2001 | Saleh et al. |

(Continued)

FOREIGN PATENT DOCUMENTS

JP        60-347529         12/1994

*Primary Examiner*—Nay A Maung
*Assistant Examiner*—Andrew Wendell
(74) *Attorney, Agent, or Firm*—Duane Morris LLP

(57) ABSTRACT

A novel system and method for a network overlay geolocation system operating in a host wireless communication system with repeaters (350a, 350b) is disclosed. Embodiments of the novel system and method enable the geolocation system to determine if signals being received by the geolocation system arrive directly from a target mobile appliance or if the signals are passing through a repeater (350a, 350b) and therefore are subject to a known time delay. Embodiments of the novel system and method provide a more accurate geolocation of mobiles served by repeater stations than capable in the prior art.

17 Claims, 4 Drawing Sheets

U.S. PATENT DOCUMENTS

| | | |
|---|---|---|
| 6,246,336 B1 * | 6/2001 | Hymel ................. 340/7.41 |
| 6,295,455 B1 | 9/2001 | Fischer et al. |
| 6,311,043 B1 | 10/2001 | Haardt et al. |
| 6,334,059 B1 | 12/2001 | Stilp et al. |
| 6,470,195 B1 | 10/2002 | Meyer |
| 6,477,161 B1 | 11/2002 | Hudson et al. |
| 6,501,955 B1 | 12/2002 | Durrant et al. |
| 6,553,322 B1 | 4/2003 | Ignagni |
| 6,782,264 B2 | 8/2004 | Anderson et al. |
| 6,795,699 B1 * | 9/2004 | McCraw et al. ............ 455/408 |
| 6,834,234 B2 | 12/2004 | Scherzinger et al. |
| 6,839,539 B2 | 1/2005 | Durrant et al. |
| 6,845,240 B2 | 1/2005 | Carlson et al. |
| 6,922,170 B2 | 7/2005 | Alexander, Jr. |
| 6,952,158 B2 * | 10/2005 | Kennedy, Jr. ........... 340/286.14 |
| 7,076,256 B1 * | 7/2006 | Orler et al. .............. 455/456.1 |
| 2001/0027110 A1 * | 10/2001 | Tekinay ................. 455/506 |
| 2002/0094821 A1 | 7/2002 | Kennedy, Jr. |
| 2003/0008663 A1 * | 1/2003 | Stein et al. .............. 455/456 |
| 2003/0045230 A1 * | 3/2003 | Weissman ............... 455/11.1 |
| 2003/0054814 A1 * | 3/2003 | Karabinis et al. ........ 455/427 |
| 2003/0069024 A1 * | 4/2003 | Kennedy, Jr. ............ 455/456 |
| 2003/0139188 A1 * | 7/2003 | Chen et al. .............. 455/456 |
| 2003/0190919 A1 | 10/2003 | Niemenmaa |
| 2004/0043775 A1 | 3/2004 | Kennedy, Jr., et al. |
| 2005/0130672 A1 * | 6/2005 | Dean et al. .............. 455/456.1 |

* cited by examiner

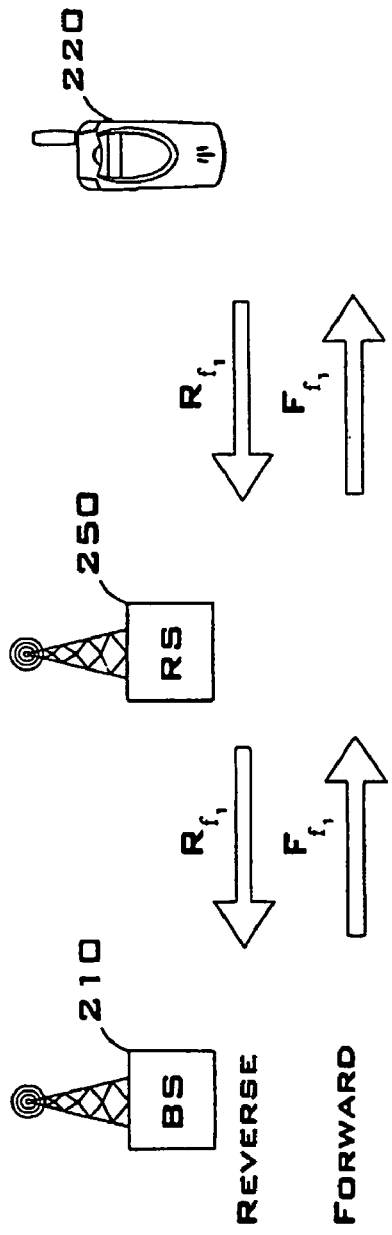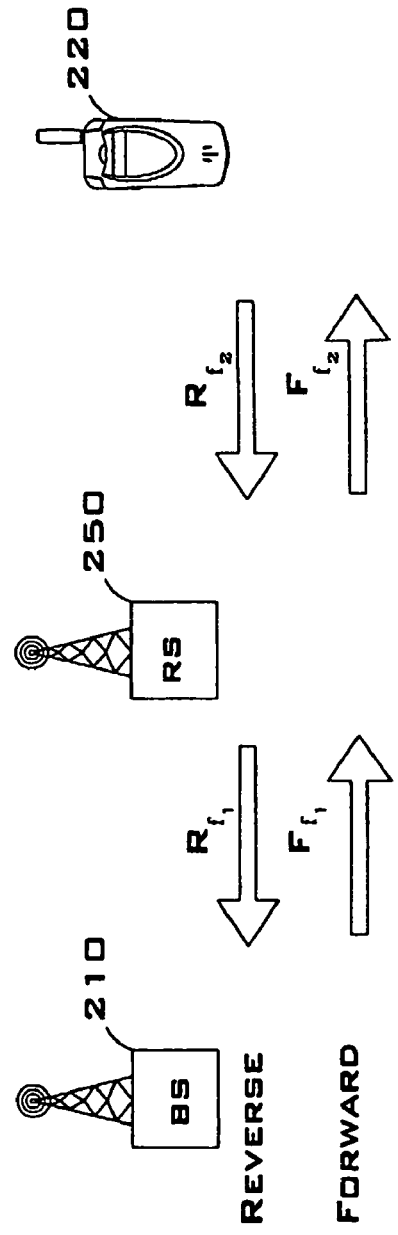

SYSTEM AND METHOD OF OPERATION FOR NETWORK OVERLAY GEOLOCATION SYSTEM WITH REPEATERS

CROSS REFERENCES

The present application is co-pending with and claims priority benefit of provisional application entitled "Geolocation of Mobile Appliances", Application Ser. No. 60/418,342 and filed on 16 Oct. 2002, and the provisional application entitled "System and Method for Network Overlay Geolocation System with Repeaters in a GSM Network", Application Ser. No. 60/503,490 and filed on 17 Sep. 2003, the entirety of each is hereby incorporated herein by reference.

The present application is related to and concurrently filed with applications titled "A NETWORK OVERLAY GEOLOCATION SYSTEM WITH SMART ANTENNAS AND METHOD OF OPERATION" 10/531,040, "A SYSTEM AND METHOD FOR ENHANCING THE ACCURACY OF A LOCATION ESTIMATE" 10/531,044, "NETWORK OVERLAY LOCATION SYSTEM AND METHOD FOR AIR INTERFACE WITH FREQUENCY HOPPING" 10/531,041, "A SYSTEM AND METHOD FOR ESTIMATING THE MULTI-PATH DELAYS IN A SIGNAL USING A SPATIALLY BLIND ANTENNA ARRAY 10/531,039, and "WIRELESS COMMUNICATION NETWORK MEASUREMENT DATA COLLECTION USING INFRASTRUCTURE OVERLAY-BASED HANDSET LOCATION SYSTEMS" 10/531,042, filed Oct. 16, 2003, the entirety of each of these applications is incorporated herein by reference.

BACKGROUND

Applicant's disclosure is directed generally towards a wireless communications network overlay for determining the location of mobile appliances.

The use of wireless communication devices such as telephones, pagers, personal digital assistants, laptop computers, etc., hereinafter referred to collectively as "mobile appliances", has become prevalent in today's society. Recently, at the urging of public safety groups, there has been increased interest in technology which can determine the geographic position, or "geolocate" a mobile appliance in certain circumstances. For example, the Federal Communication Commission (FCC) has issued a geolocation mandate for providers of wireless telephone communication services that puts in place a schedule and an accuracy standard under which the providers of wireless communications must implement geolocation technology for wireless telephones when used to make a 911 emergency telephone call (FCC 94-102 E911).

In addition to E911 emergency related issues, wireless telecommunications providers are developing location-enabled services for their subscribers including roadside assistance, turn-by-turn driving directions, concierge services, location-specific billing rates and location-specific advertising.

To support FCC E911 rules to locate wireless 911 callers, as well as the location enabled services, the providers of wireless communication services are installing mobile appliance location capabilities into their networks. In operation, these network overlay location systems take measurements on RF transmissions from mobile appliances at base station locations surrounding the mobile appliance, and estimate the location of the mobile appliance with respect to the base stations. Because the geographic location of the base stations is known, the determination of the location of the mobile appliance with respect to the base station permits the geographic location of the mobile appliance to be determined. The RF measurements of the transmitted signal at the base stations can include the time of arrival, the angle of arrival, the signal power, or the unique/repeatable radio propagation path (radio fingerprinting) derivable features. In addition, the geolocation systems can also use collateral information, e.g., information other than that derived for the RF measurement to assist in the geolocation of the mobile appliance, i.e., location of roads, dead-reckoning, topography, map matching etc.

In a network-based geolocation system, the mobile appliance to be located is typically identified and radio channel assignments determined by (a) monitoring the control information transmitted on radio channel for telephone calls being placed by the mobile appliance or on a wireline interface to detect calls of interest, i.e., 911, (b) a location request provided by a non-mobile appliance source, i.e., an enhanced services provider. Once a mobile appliance to be located has been identified and radio channel assignments determined, the location determining system is first tasked to determine the geolocation of the mobile appliance and then directed to report the determined position to the requesting entity or enhanced services provider.

The monitoring of the RF transmissions from the mobile appliance or wireline interfaces to identify calls of interest is known as "tipping", and generally involves recognizing a call of interest being made from a mobile appliance and collecting the call setup information. Once the mobile appliance is identified and the call setup information is collected, the location determining system can be tasked to geolocate the mobile appliance.

FIG. 1 shows a conventional mobile-appliance communication system having base stations 10a-c for communicating with a mobile appliance 20. Each base station 10 contains signal processing equipment and an antenna for transmitting to and receiving signals from the mobile appliance 20 as well as other base stations. A Base Station Controller ("BSC") and/or Mobile Switching Center ("MSC") 45 typically is connected to each base station 10 through wireline connection 41. A mobile appliance location determining sensor 30 i.e., wireless location sensor ("WLS") may be positioned at some or all of the base stations 10 to determine the location of mobile appliance 20 within the signal coverage area of the communication system. A network overlay system is generally composed of two main components, one that resides at the base station that makes measurements on the RF signal emanating from the wireless device, the WLS 30, and one that resides at the mobile switch that tasks the WLS groups to collect data and then uses the data to compute a location estimate, this latter component is generally referred to as the Geolocation Control System ("GCS") 50. In the normal course of operation, the GCS is tasked by an outside entity, e.g., the Mobile Positioning Center ("MPC") 40, to generate a location estimate on a particular mobile appliance. The tasking is accompanied by information on the mobile of interest including the serving base station and sector for the call and the RF channel (frequency, time slot, CDMA code, etc.) being used by the wireless communications network to complete the wireless connection. Once the GCS receives this tasking, based on the serving sector, it tasks a set of WLS units to make measurement on the RF emission of the mobile. The WLS units make the measurements, and report them to the GCS. The GCS then computes a location estimate using some mathematical or data matching algorithm. Alternatively, control signaling on RF or wireline interfaces used to set up calls in the wireless network can be scanned to detect the placement of a call of interest. The signaling that occurs on the RF control channel can be used to determine location, or call setup/channel assignment parameters can be extracted from the control messaging to determine which traffic channel to use for location related measurements.

Network overlay location systems typically locate a mobile appliance on the traffic channels of a wireless network. The system typically uses sensors employing techniques of time difference of Arrival ("TDOA") supplemented with Angle of Arrival ("AOA") in some case to perform a multi-site location computation. The traffic channel assignment information is provided through a separate process, with one option being a wireline interface providing MOBINFO (IS-41 Mobile Information) parameters passed by the Mobile Positioning Center as part of the GPOSREQ (J-STD-036 Geolocation Position Request) message from the MPC to the GCS 50.

To meet the ever growing demand for mobile communication, wireless communication systems deploy repeater stations to expand range and concentration of coverage. In FIG. 1, a repeater 50a, associated with base station 10a, is located to extend the coverage area to encompass the back side of the mountain 1. The repeater 50b, associated with base station 10c, is mounted on a building and is used to provide service within the building 2.

Repeaters typically fall into two categories: (1) non-translating, also known as wideband, and (2) translating, also known as narrowband. As shown in FIG. 2a, non-translating repeater 250 simply passes the forward $F_{f1}$ and reverse $R_{f1}$ frequencies from the base station 210 and mobile appliance 220 respectively to and from the repeater coverage location. Often wideband repeaters are "in-building" or serve limited coverage areas. While the description of non-translating repeaters above and translating repeaters below are described in reference to frequency, their operation can equally be described in terms of channels, and the use of the term frequency should not be construed to limit the scope of the present disclosed subject matter.

A translating repeater assigns the mobile to a different traffic channel unbeknownst to the base station, mobile switch, MPC, and the base station controller. As shown in FIG. 2b, the translating repeater uses the base station traffic channel $R_{f1}$ for repeater 250 to base station 210 communication while the mobile appliance 220 utilizes a separate frequency $R_{f2}$ for mobile to repeater communications. Translating repeaters act similarly in the forward direction using $F_{f1}$ from the base station 210 to the repeater station 250 and $F_{f1}$ from the repeater station 250 to the mobile appliance 220. In both cases, the existence of the repeater is usually transparent to the network.

Repeaters typically communicate with the host base station via an RF link as shown in FIG. 3 between base station 310 and repeater 350a. This connection allows remote operation of the repeater without physical ties back to the host base station, which is particularly advantageous in rugged or other areas where laying lines are difficult or costly. Some repeaters, generally non-translating repeaters, use a fiber optic or copper wire "tether" instead of an RF link to communicate with the host base station as shown in FIG. 3, where base station 310 is connected to repeater station 350b by tether 351. RF signals are placed onto the tether at the repeater, and then summed into the normal base station antenna path at the antenna feed interface 311 at the host base station. After integration into the normal base station antenna path, the signal from the repeater is indistinguishable to the base station regarding its origin (e.g., from the base station antennas or from a tether). In this tether architecture as well, the host base station has no knowledge of the repeater's existence or that a call is being served by the repeater.

Neither the base station nor the switch knows that a repeater is serving a call. Therefore the GPOSREQ information from the MPC which, in part, originates from the switch, is not able to alert the Geolocation system that a repeater is in use. When a prior art network overlay location system attempts to locate a mobile being served by a repeater without knowing that a repeater is serving the mobile, a number of alternatives can occur. The location system may locate the mobile based on receiving only RF signals directly from the mobile at a sufficient number of sites to locate the mobile. This alternative is the same as if the repeater was not involved from the standpoint of the location system. Another alternative is that the location system would receive signals from the repeater backhaul link antenna, and produce a location. Thus, the location of the repeater antenna (rather than the mobile) would be the "worst case" geolocation computed location. For example, a repeater installed as an in-building distribution system would use indoor antennas to communicate with the indoor handsets, and an outdoor antenna to communicate with the host base station. If the geolocation system were unable to locate the mobile itself, the location of the outdoor antenna (the repeater) would be used. Since this is the location of the building housing the mobile, this is a much better location estimate than the Phase I cell-sector information and is often compliant within the FCC accuracy mandate over the given network. The Phase I system typically does not know of repeater existence and uses the host cell's cell-sector information for location. While acceptable in some cases, as identified above, using the location of repeater 50a in FIG. 1, would be of little use. In the case where the location system receives the RF signal from a mixed set of sources (some from the mobile and some from the repeater backhaul antenna), an erroneous location estimate can be generated. In the case where the location system does not receive RF at sufficient WLS sites to generate a location estimate due to the effects of the repeater action or transmitted power of the mobile or directionality of the repeated signal from the repeater backhaul antenna, no location estimates will be reported.

Therefore, there is a need in the prior art for a network overlay geolocation system and method of operation in a host wireless communication system that provides accurate geolocation of mobiles served by repeater stations. In order to accomplish this, there is a need to overcome the deficiencies in the prior art by employing a novel geolocation system and method that is capable of identifying when a mobile's signal is being received via a repeater.

In view of this need, it is an object of the disclosed subject matter to obviate the deficiencies in the prior art and present an improved method for determining the location of a mobile appliance in a wireless communication system with base stations and a repeater for communicating with the mobile appliance. The wireless communication system includes a mobile positioning center and the repeater is connected with a communication tether to the base station. A plurality of geolocation sensors are co-located with the plural base stations and the mobile positioning center provides mobile information to the geolocation system. The improvement includes the step of monitoring the communication system with the WLS and determining if a target mobile appliance is served by the at least one repeater.

It is also an object of the disclosed subject matter to present an improved method of determining the location of a mobile appliance in a wireless communication system having base stations and repeater stations for communicating with the mobile appliance. The repeater station is connected to the base stations with a communication tether. The improvement includes the steps of detecting signals from a target mobile appliance on the communication tether and using a known delay attributed to the communication tether and the respective repeater station to determine the location of the target mobile appliance.

It is another object of the disclosed subject matter to present an improved method for determining the location of a mobile appliance in a wireless communication system with base stations and repeater stations for communicating with the mobile appliance where a repeater station is connected to its base stations with a communication tether. The improvement includes determining the location of the repeater station using mobile information parameters received from an MPC and using the location of the repeater station, or the centroid of the repeater's coverage area, as the location of the mobile appliance.

It is still another object of the disclosed subject matter to present an improved method for determining the location of a mobile appliance in a wireless communication system with base stations and repeaters. The method includes the step wherein the repeater station relays a mobile appliance's signal on a different channel than the signal transmitted by the mobile appliance. The improvement includes relaying from the repeater station information regarding the channel of the mobile appliance's signal to a geolocation system and using the information to detect the mobile appliance's signal or repeater backhaul antenna signal and calculate the mobile appliance's location.

It is yet another object of the disclosed subject matter to present an improved method for determining the location of a mobile appliance in a wireless communication system with base station and repeaters, where the repeaters relay the mobile appliance's signal on the same channel as the channel in which the signal was received by the repeater, and where a mobile positioning center provides mobile information to assist in the location of the mobile appliance. The improvement includes using the first signal received from the mobile appliance at each of the plural base stations to determine the location of the mobile appliance.

It is an additional object of the disclosed subject matter to present a novel network overlay geolocation system for locating a mobile in a host wireless communication system. The host wireless communication system includes a base station and a repeater station connected by a communication tether. The network overlay geolocation system has a geolocation sensor attached to the communication tether between the base station and said repeater station.

It is also an additional object of the disclosed subject matter to present a novel wireless communication system for providing communication to and from a mobile appliance. The system includes a base station and a repeater station interconnected by a communication tether connected to the base station at an antenna feed interface and a mobile positioning center for providing mobile information. The network overlay geolocation system has a geolocation sensor co-located at the base station on the tether prior to the antenna feed interface.

These objects and other advantages of the disclosed subject matter will be readily apparent to one skilled in the art to which the disclosure pertains from a perusal or the claims, the appended drawings, and the following detailed description of the preferred embodiments.

BRIEF DESCRIPTION OF THE DRAWINGS

FIG. 2a is an illustration of the operation of a non-translating repeater station.

FIG. 2b is an illustration of the operation of a translating repeater station.

DETAILED DESCRIPTION

Figure 1:
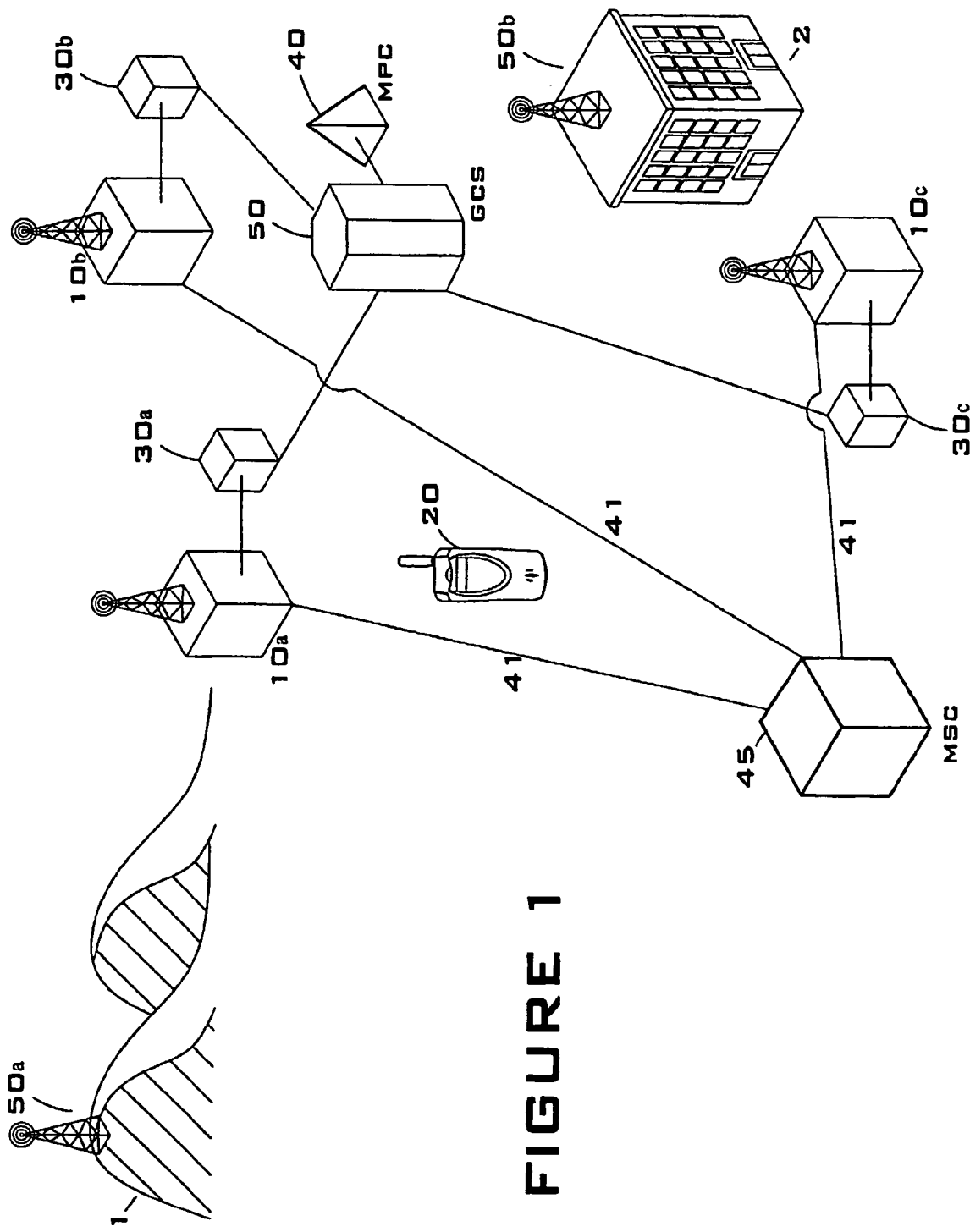
FIG. 1 is a prior art wireless communication system with a network overlay geolocation system.
Figure 3:
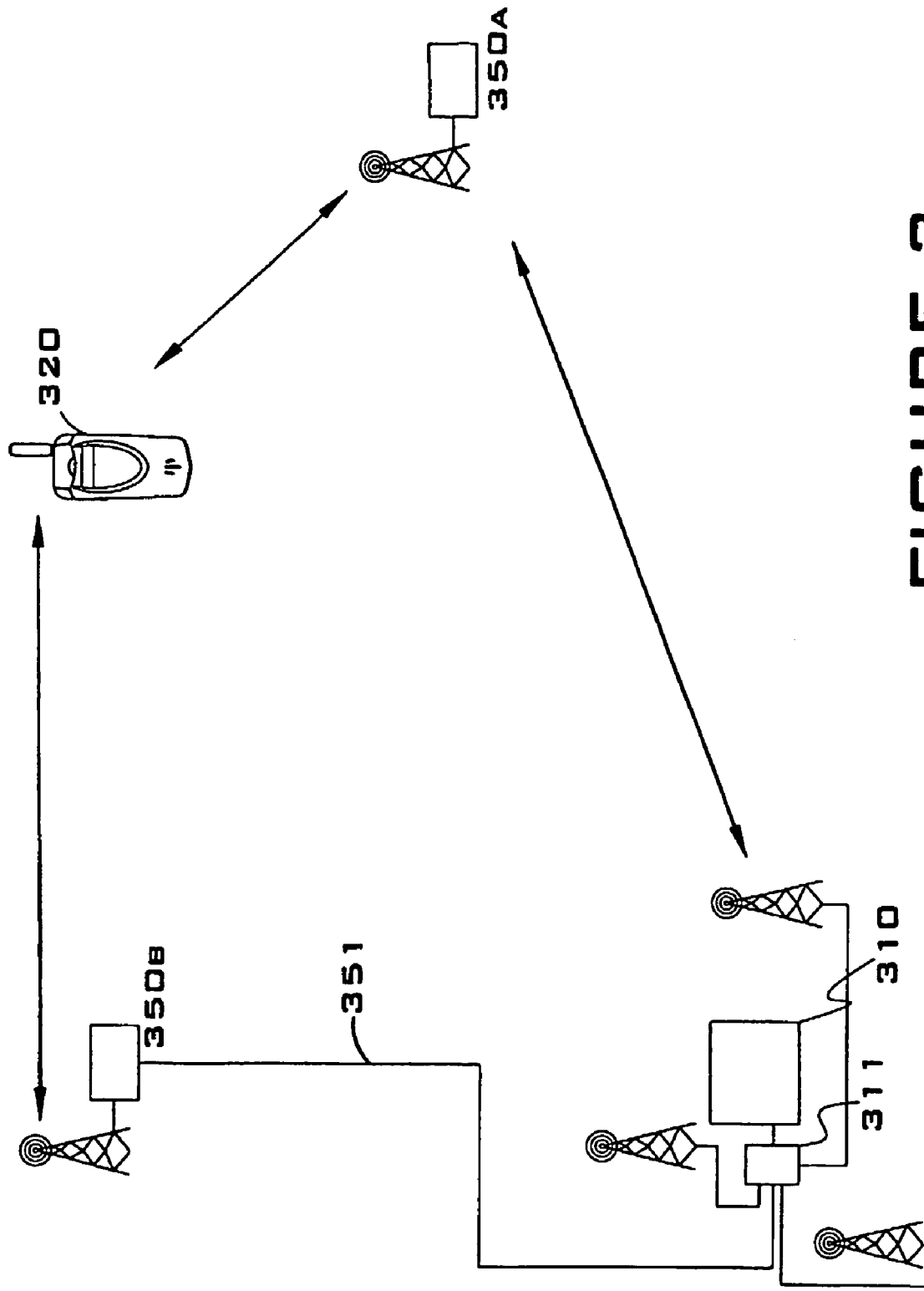
FIG. 3 is an illustration of a wireless communication system with repeater stations connected with an RF link and over a tether.

An important aspect of the presently disclosed subject matter is that the geolocation system can determine when a received signal from a mobile has passed through a repeater. Prior art systems do not have this capability and consequently treat all the signals received by the geolocation system as having been received directly from the target mobile. For example, the ability to determine if a signal from a mobile has passed through a repeater enables embodiments of the disclosed subject matter to determine in some instances (a) at least a default location of a mobile (e.g., at the repeater) where the prior art could determine no location at all, and/or (b) a location of the mobile where the prior art may return a location with large errors. The foregoing are exemplary only and shall not be used to limit the invention. These examples and others are discussed in more detail below.

Since the presently-disclosed subject matter is capable of determining whether a signal received from a mobile has passed through a repeater, geolocation systems using the present subject matter can better determine the location of a mobile appliance.

In a wireless communication system utilizing a repeater, a geolocation system of one embodiment of the present subject matter can compute the location of the mobile appliance itself and only fall back to the repeater's location (which may be, for example, the location of the repeater's electronics, the location of the repeater's antenna, or the location of the centroid of the repeater's coverage area) a low percentage of the time. This is accomplished by having the geolocation system focus on and use the signal(s) arriving earlier in time at the geolocation sensor locations for TDOA, AOA or other type of location method discussed herein when later-arriving signal(s) are delayed by an amount approximately equal to the repeater delay. As is known in the art, repeaters add some time delay to the mobile signal, whether the repeater is translating or non-translating, tethered or untethered (sometimes referred to herein as RF Backhaul). The delay arises from the fact that the repeater receives a signal from the mobile, reproduces (or translates) and amplifies the signal, and then transmits the signal to the base station. Therefore, in most cases, signals that travel directly between the mobile and a geolocation system arrive earlier in time, by approximately a known amount (i.e., the repeater delay), before signals that travel from the mobile to the geolocation system through a repeater.

Likewise, in a wireless communication system utilizing a repeater, a geolocation system of another embodiment of the present subject matter can compute the location of the mobile appliance itself and only fall back to the repeater's location a low percentage of the time. In this embodiment, the repeater puts a tag on the mobile signal that passes through the repeater. The tag can be any type of tag added to a signal as is well known in the art. One non-limiting example consistent with this discussion is the timing advance ("TA") measurement in a GSM mobile communication system. The geolocation system receives the repeated signal, recognizes the repeater's tag and consequently knows that the signal is a repeated signal with a repeater delay associated therewith, and processes the signal accordingly (i.e., the geolocation system "operates" on the tag). In this embodiment, it is not necessary to determine the difference in times of arrival of direct signals and repeated signals at the geolocation system.

The ability to discern the difference between direct signals and repeated signals (i.e., signals that arrive via a repeater) in either of the above-mentioned embodiments allows for the geolocation system to better determine a location for the mobile. In some instances, the repeater signals may be ignored. As a non-limiting example, if mixed signals (i.e., both direct signals and repeated signals) are received at the geolocation system, the geolocation system may default to the direct signal(s) and locate the mobile without reference to the repeated signal.

It will be useful to compare prior art systems with systems operating in accordance with the present subject matter. As will be shown below, the inability of the prior art to determine if a mobile's signal has been received via a repeater may result in severe errors in the geolocation estimate. The following Table 1 indicates what a typical prior art system will output since the prior art is incapable of determining the presence of a repeater in a wireless communication system. It will be understood by those of skill in the art that Table 1 below (and the following Tables 2 and 3) assume that the only location information is derived from the target mobile's signal:

TABLE 1

| Scenario | Non-Translating Repeater | |
|---|---|---|
| | RF Backhaul | Tethered |
| (1) GCS Receives Measurements from Target Mobile Only: | | |
| (a) <3 signals received | No geolocation determined | No geolocation determined |
| (b) ≧3 signals received | Determine geolocation of mobile | Determine geolocation of mobile |
| (2) GCS Receives Measurements from Repeater Only: | | |
| (a) <3 signals received | No geolocation determined | No geolocation determined |
| (b) ≧3 signals received | Determine geolocation of repeater | Determine geolocation of repeater |

TABLE 1-continued

| Scenario | Non-Translating Repeater | |
|---|---|---|
| | RF Backhaul | Tethered |
| (3) GCS Receives Measurements from Both Mobile and Repeater: | | |
| (a) <3 signals received | No geolocation determined | No geolocation determined |
| (b) ≧3 signals received | Possible large errors in geolocation | Possible large errors in geolocation |

Regarding Table 1 above, it will be noted that only non-translating repeaters are shown in Table 1. Table 1 does not include translating repeaters since the prior art has no way of dealing with translating repeaters since the prior art does not, for example, include a mechanism to track the translation of the frequency due to the translating repeater. Therefore, without knowledge of the proper frequency for the mobile, a reported geolocation may actually be based in part on energy not attributable to the target mobile. Consequently, the determined geolocation may be highly inaccurate and the prior art would have no way of knowing that a problem exists.

It will be obvious to those of skill in the art that since the prior art cannot determine if there is a repeater being used in the system, then the prior art cannot determine the difference between signals received directly from the mobile and signals received via a repeater. Therefore, the prior art cannot distinguish between, for instance, Scenario (1)(b), in which the geolocation of the mobile is actually determined and Scenario (2)(b), in which the geolocation of the repeater is actually determined. In both Scenarios, the prior art system will report that the geolocation of the mobile has been determined. Similarly, Scenario (3)(b) is likewise indistinguishable from either Scenario (1)(b) or Scenario (2)(b). However, Scenario (3)(b) will most likely have large errors due to the unaccounted for time delay in the measurement(s) that arrived at the GCS via a repeater. Additionally, the prior art can make no determination of geolocation in the event less than 3 measurements are received by the GCS, consistent with the assumption stated above.

The following table, Table 2, indicates what one embodiment of the disclosed subject matter will output when a repeater is operating in a wireless communication system. In this embodiment, there is a known difference in time of arrival between a signal from the target mobile appliance that is received by the geolocation system directly from the mobile and a signal from the mobile that is received by the geolocation system via a repeater.

TABLE 2

| Scenario | Non-Translating Repeater | | Translating Repeater | |
|---|---|---|---|---|
| | RF Backhaul | Tethered | Know Translations | Do Not Know Translations |
| (1) GCS Receives Measurements from Target Mobile Only: | | | | |
| (a) <3 signals received | No geolocation determined | Determine repeater location in some instances | No geolocation determined | N/A |

TABLE 2-continued

| | | | Translating Repeater | |
| | Non-Translating Repeater | | Know | Do Not Know |
| Scenario | RF Backhaul | Tethered | Translations | Translations |
| --- | --- | --- | --- | --- |
| (b) ≧3 signals received | Determine geolocation of mobile | Determine geolocation of mobile | Determine geolocation of mobile | N/A |
| (2) GCS Receives Measurements from Repeater Only: | | | | |
| (a) <3 signals received | No geolocation determined | Determine repeater location in some instances | Determine repeater location in some instances | N/A |
| (b) ≧3 signals received | Determine geolocation of repeater | Determine geolocation of repeater | Determine geolocation of repeater | N/A |
| (3) GCS Receives Measurements from Both Mobile and Repeater: | | | | |
| (a) <3 signals received | Determine repeater location in some instances | Determine repeater location in some instances | Determine repeater location in some instances | N/A |
| (b) ≧3 signals received | Determine mobile location in some instances | Determine mobile location | Determine mobile location | Determine repeater location in some instances |

A comparison of Table 1 (prior art) and Table 2 (an embodiment of the present subject matter, designated generally as Embodiment Alpha) indicates that the present subject matter can determine a useful location for the mobile appliance more often (and more accurately) than the prior art. For example, the prior art for Scenario (3)(a), for non-translating repeaters, cannot determine any location for the mobile. However, Embodiment Alpha can, in some instances, output as the mobile's location the location of the repeater. When, through measuring TOA from both the direct path and the repeater, it can be determined that the mobile is in the proximity of the repeater. As discussed elsewhere herein, the location of the repeater typically is within acceptable geolocation parameters. As another example, the prior art for Scenario (3)(b), for non-translating repeaters, may output a geolocation for the mobile that has large errors, as discussed above. However, Embodiment Alpha may determine the mobile's location in some instances where TOAs from both the direct path and through the repeater are measured and the TOAs from the direct path are used to determine the position of the mobile. Furthermore, the prior art cannot determine a location for the mobile in any Scenario when a translating repeater is in use. Embodiment Alpha can determine the location of the mobile as indicated in Table 2 so long as the geolocation system has knowledge of the translations being used. If the translations are not known, then Embodiment Alpha cannot determine the location of the mobile, as indicated by "N/A" ("Not Applicable") in Table 2.

The following table, Table 3, indicates what another embodiment of the disclosed subject matter will output when a repeater is operating in a wireless communication system. In this embodiment, a repeater places a tag on the signal passing through it that the geolocation system can recognize and therefore know that the associated signal is a repeated signal.

TABLE 3

| | | | Translating Repeater | |
| | Non-Translating Repeater | | Know | Do Not Know |
| Scenario | RF Backhaul | Tethered | Translations | Translations |
| --- | --- | --- | --- | --- |
| (1) GCS Receives Measurements from Target Mobile Only: | | | | |
| (a) <3 signals received | No geolocation determined | Determine repeater location | No geolocation determined | N/A |

TABLE 3-continued

|  | Non-Translating Repeater | | Translating Repeater | |
| --- | --- | --- | --- | --- |
| Scenario | RF Backhaul | Tethered | Know Translations | Do Not Know Translations |
| (b) ≧3 signals received | Determine geolocation of mobile | Determine geolocation of mobile | Determine geolocation of mobile | N/A |
| (2) GCS Receives Measurements from Repeater Only: | | | | |
| (a) <3 signals received | Determine repeater location | Determine repeater location | Determine repeater location | N/A |
| (b) ≧3 signals received | Determine geolocation of repeater | Determine geolocation of repeater | Determine geolocation of repeater | N/A |
| (3) GCS Receives Measurements from Both Mobile and Repeater: | | | | |
| (a) <3 signals received | Determine repeater location | Determine repeater location | Determine repeater location | N/A |
| (b) ≧3 signals received | Determine mobile location in some instances | Determine mobile location | Determine mobile location | Determine repeater location in some instances |

A comparison of Table 1 (prior art) and Table 3 (an embodiment of the present subject matter, designated generally as Embodiment Beta) indicates that the present subject matter can determine a useful location for the mobile appliance more often (and more accurately) than the prior art. For example, the prior art for Scenario (3)(b), for non-translating repeaters, may output a geolocation for the mobile that has large errors, as discussed above. However, Embodiment Beta may determine the mobile's location in some instances where TOAs from both the direct path and through the repeater are measured and the TOAs from the direct path are used to determine the position of the mobile. As discussed elsewhere herein, the location of the repeater typically is within acceptable geolocation parameters. Furthermore, the prior art cannot determine a location for the mobile in any Scenario when a translating repeater is in use. Embodiment Beta can determine the location of the mobile as indicated in Table 3 so long as the geolocation system has knowledge of the translations being used. If the translations are not known, then Embodiment Beta cannot determine the location of the mobile, as indicated by "N/A" ("Not Applicable") in Table 3.

In the case of an RF backhaul repeater, neighboring repeaters are not used by the geolocation system to participate in location measurements, since no sensor hardware is typically installed at the repeater sites, rather adjacent cell cites participate. The delay imposed by the repeaters serving a call not only would cancel out during time difference of arrival calculations, but the signal would likely be ignored since the repeater signals are received after the mobile's signal, therefore the delay does not need to be known. Alternatively, the delay value can be known, and kept in a database and compensated for during time difference calculations, if it is known that the signal received was from the repeater, for instance where topology effectively prevents the mobile's signal from being received at the base station such as is depicted in FIG. 1 with regards to repeater 50a.

Figure 4:
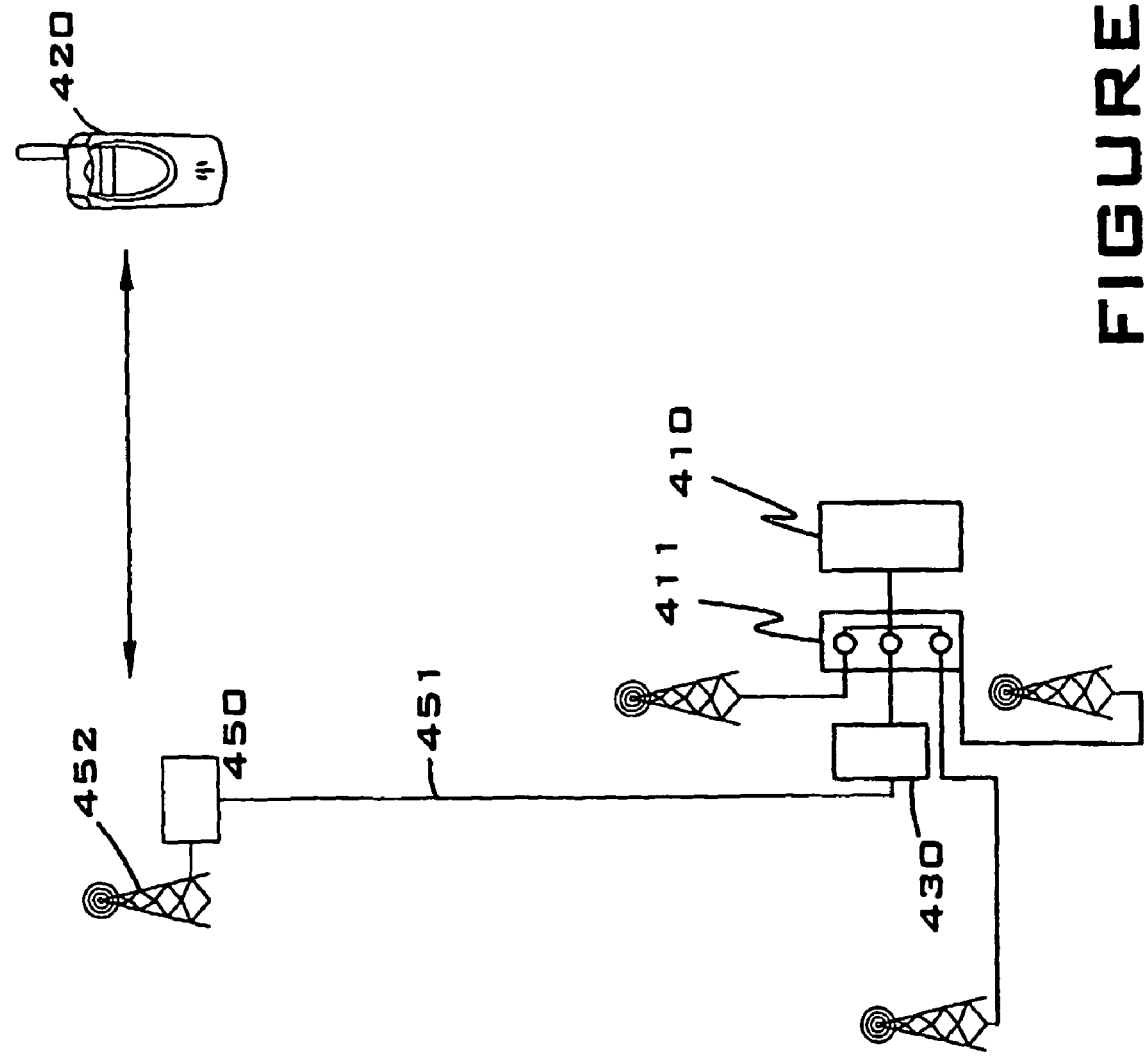
FIG. 4 is an illustration of a geolocation sensor integrated into a base station before the antenna feed interface.

Tethered repeater installations do not utilize a RF link for communication back to the base station, but rather use a fiber optic or copper tether as a back haul. In this scenario, a geolocation system sensor is connected at the host base station to the repeater RF signal prior to the antenna feed interface connection at the base station. FIG. 4 shows the location of the geolocation sensor for a repeater tethered to a base station. The base station 410 which includes the antennas 412 receives the antenna output at an antenna feed interface 411. In the embodiment shown, the geo location sensor 430 is located upstream of the antenna feed interface 411. The signal from the mobile appliance 420 is received at repeater station 450 with antenna 452. The signal is repeated over the communication tether 451 to the base station 410. The geolocation sensor is located prior to or at the antenna feed interface 411 or more particularly before the antenna feeds are summed together and supplied to the base station 410. For the purposes of this application, the antenna feed interface is defined as the point at which the antenna outputs are summed and the origin is no longer distinguishable. While the embodiment shown in FIG. 4 shows one sensor, a plurality of sensors can be used at the base station or a sensor that switches across the inputs to the base station is equally envisioned. The location of the geolocation sensor allows the geolocation system to determine when a call is served by a repeater, as well as utilize neighboring repeaters to assist with the location of the mobile since these neighboring repeaters will be receiving the actual mobile signal, not the signal transmitted from the serving repeater and their actual delay times are known.

As with the RF link repeater type, neither the base station nor the switch is aware that a repeater is serving the call. Therefore the GPOSREQ information from the MPC is not able to alert the geolocation system that a repeater is in use. The geolocation system locates the transmitter using the corresponding MOBINFO parameters passed from the MPC. The sensor at the base station is able to determine when a repeater is serving a call, since the mobile's signal is intercepted on the tether prior to being added to the antenna feeds of the base stations antennas. This information allows the geolocation system the ability to adapt the sensors participating in a location to account for the tethered repeater by adjusting the TOA, among other things, and calculate the location of the mobile transmitter.

In the tethered link repeater instance, the signal delay of the repeater as well as any fiber or copper tether lines must be known and stored in the geolocation system database. These delays are advantageously determined experimentally, however empirical or theoretical delay values can also be incorporated. The geolocation system takes these delays into account when computing the TDOA location of the mobile. Since delay information is known, neighboring repeaters may be used as TDOA sensor sites to aid in the mobile location. This is the only scenario where the delay of the repeater components needs to be known. This differs from the case of an RF link, where neighboring repeaters are not used as TDOA sensor sites and thus their delay information is not required. As discussed previously the delay imposed by these repeaters serving a call, cancels out during time difference calculations.

In the translating repeater case, neither the base station nor the switch know that a repeater is serving a call, nor do they know the frequency on which the phone is transmitting. Therefore the GPOSREQ information from the MPC is not able to alert the geolocation system that a repeater is in use or the frequency of the target mobile. Rather, the geolocation system locates the transmitter using the corresponding MOBINFO parameters passed from the MPC, which in the case of a mobile served by a translating repeater, is the location of the repeater antenna (rather than the mobile). The "worst case" geolocation system computed location would also be the "best case" geolocation system computed location. As the case with the wideband repeater this worst case estimate is sometimes a much better location estimate than the Phase I cell-sector information and is often compliant within the FCC accuracy mandate over the given network. The Phase I system typically does not know of repeater existence and used the host cell's cell-sector information for location. Greater accuracy can be achieved for translating repeaters by establishing communication with the repeater equipment to gather mobile transmitter frequency information. If the geolocation system is aware of the mobile's frequency, or other identifying signal characteristic, the system can search for the mobile's signal at other base stations or repeaters, and if a tethered repeater, can use known system time delays to determine the TDOA or AOA calculations. Otherwise, the location of the translating repeater is given as the location. Alternatively, if economical, a translating repeater's translation can be mapped and stored in a database accessible to the geolocation system, however, such mapping may be difficult in a system that dynamically allocates channels.

While preferred embodiments of the present inventive system and method have been described, it is to be understood that the embodiments described are illustrative only and that the scope of the embodiments of the present inventive system and method is to be defined solely by the appended claims when accorded a full range of equivalence, many variations and modifications naturally occurring to those of skill in the art from a perusal hereof.

What we claim is:

1. A method of determining the location of a mobile appliance in a wireless communication system having plural base stations and at least one repeater for communicating with the mobile appliance, and a mobile positioning center, wherein a plurality of geolocation sensors are co-located with the plural base stations, and wherein the at least one repeater is connected with a communication tether to the base station, and the mobile position center provides mobile information to the geolocation system, the improvement comprising the step of monitoring the communication system with the geolocation system and determining if a target mobile appliance is served by the at least one repeater, wherein the geolocation sensors monitor the tether between the at least one repeater and an antenna feed interface for the mobile appliance's signal.

2. The method of claim 1 wherein the mobile appliance's signal is a traffic signal.

3. The method of claim 1 wherein the mobile appliance's signal is a reverse pilot signal.

4. The method of claim 1 wherein the mobile information is control information.

5. The method of claim 4 wherein the control information is call set up information or mobile registration process information.

6. A method of determining the location of a mobile appliance in a wireless communication system having plural base stations and at least one repeater for communicating with the mobile appliance, and a mobile positioning center, wherein a plurality of geolocation sensors are co-located with the plural base stations, and wherein the at least one repeater is connected with a communication tether to the base station, and the mobile position center provides mobile information to the geolocation system, the improvement comprising the step of monitoring the communication system with the geolocation system and determining if a target mobile appliance is served by the at least one repeater; and, adjusting the time of arrival of the mobile appliances signal based on the determination if the mobile appliance is being served by the one of the at least one repeaters.

7. The method of claim 6, further comprising the step of adjusting the time of arrival of the mobile signal at the geolocation sensor with known time delays of the at least one repeater and communication tether.

8. The method of claim 7, further comprising the step of adjusting the time of arrival of the mobile signal at another of the plural geolocation sensors with known time delays of another one of the at least one repeater and respective communication tether.

9. The method of claim 6, further comprising the step of accessing with the geolocation sensors the known time delays from a database.

10. The method of claim 7, wherein the adjusted time of arrivals are used by the geolocation sensors in determining the location of the mobile appliance.

11. A method for determining the location of a mobile appliance in a wireless communication system having plural base stations and plural repeaters, wherein the repeaters relay the mobile appliances signal on the same channel as the channel in which the signal was received, and where a mobile positioning center provides mobile information to assist in the location of the mobile appliance, the improvement of using the first signal received from the mobile appliance at each of the plural base stations to determine the location of the mobile appliance and disregarding a second signal received from the mobile appliance at each of the plural base stations when determining the location of the mobile appliance.

12. The method of claim 11, wherein the channel is defined by a frequency.

13. The method of claim 11, wherein the channel is defined by a time slot.

14. The method of claim 11, wherein the channel is defined by a spreading code.

15. A network overlay geolocation system for locating a mobile in a host wireless communication system, said host wireless communication system having a base station and a repeater station connected by a communication tether, said network overlay geolocation system comprising a geolocation sensor attached to the communication tether between said base station and said repeater station.

16. A wireless communication system providing communication to and from a mobile appliance comprising:
- a base station and a repeater station interconnected by a communication tether;
- a mobile positioning center for providing mobile information;
- a network overlay geolocation system with a geolocation sensor co-located at the base station;
- wherein said tether is connected to said base station at an antenna feed interface, and said geolocation sensor is located on said tether prior to said interface.

17. A method of determining the location of a mobile appliance in a wireless communication system having plural base stations and at least one repeater for communicating with the mobile appliance, where the wireless communication system has a network overlay geolocation system operably connected thereto, comprising the steps of:
- determining whether a signal received from the mobile appliance by the geolocation system has passed through a first repeater, wherein plural signals are received from the mobile appliance by the geolocation system and said first repeater is a tethered repeater;
- determining if one of the plural signals has passed through the first repeater is based in part on a difference between the times of arrival of two of the plural signals at the geolocation system, said time difference being approximately equal to a known repeater time delay;
- attaching a tag to the mobile appliance's signal that passes through the first repeater;
- determining if one of the plural signals has passed through the first repeater is based in part on the geolocation system operating on the tag; and
- determining the location of the mobile appliance based in part on the determination of whether a signal received from the mobile appliance by the geolocation system has passed through the first repeater.

* * * * *